Patented Aug. 14, 1945

2,382,636

UNITED STATES PATENT OFFICE 2,382,636

AQUEOUS EMULSIONS OF CELLULOSE ACETATE

Oskar Huppert, Newark, N. J.

No Drawing. Application September 14, 1943, Serial No. 502,371

8 Claims. (Cl. 106—170)

This application is a continuation in part of copending application, Serial No. 474,492, filed February 2, 1943. In the said application a method has been described, producing oxazoline derivatives, using a hydroaromatic ketone (isophorone), maleic anhydride as two of three starting materials.

The present application deals with the same two ingredients but also with homologues therefrom and relates to the preparation of aqueous emulsions of cellulose esters of lower aliphatic acids and their use in the impregnation and sizing of fibrous materials, fibers, textile materials, paper coating, adhesives, leather, for rendering porous surfaces waterproof—water repellent and as vehicles for dyes and pigments and for printing pastes.

Aqueous emulsions of cellulose acetate and mixed esters are up to date unknown. Only aqueous solutions of the water soluble salts of cellulose acetate acid phthalate are known and their use is very limited.

This invention has as an object the preparation of aqueous emulsions of cellulose acetate and mixed esters, such as cellulose acetate-butyrate, cellulose acetate-proprionate from their solutions in hydroaromatic ketones of the isophorone series by means of a protective colloid, such as proteins, hydrolyzed proteins, water soluble gums, dextrin, starches, dissolved in water.

A further object is to provide a process by which fibrous materials, fibers, textile fabrics, paper, leather may be rendered waterproof or water repellent or both in such a way that these properties may be retained after the goods have been repeatedly washed and subjected to laundering operations.

Solutions of cellulose acetate in solvents such as acetone, methylacetone, diacetone alcohol, tetrachlorethane, ethyllactate, ethylacetate, methylcellosolve do not form emulsions, when mixed with aqueous solutions of a protective colloid such as glue, gelatine, casein, tragacanth, arabic gum, starch, dextrin; the cellulose acetate is instantly precipitated. However with isophorone and its homologues as a solvent I have discovered that the sufficiently unexpected fact is achieved, that cellulose acetate and mixed esters are not precipitated from their solutions in isophorones when mixed with aqueous solutions of the above mentioned protective colloids. I have further discovered that these emulsions of cellulose acetate or cellulose acetate-butyrate, cellulose acetate-proprionate are perfectly homogenous, stable, stable also when diluted with cold or warm water, using the unstable additions-products of the isophorones with maleic anhydride or citraconic acid, hydrolyzed gelatine as protective colloid and an emulsifier from the class of sulfonated oils such as castor, peanut, fish, cottonseed, tallow, wool grease, of sulphated fatty acids, higher fatty alcohols, petroleum.

The emulsion and the process of the present invention is simultaneously broadly applicable in the emulsification of water repellent materials, when used in solution of hydroaromatic ketones of the isophorones series, liquid under the conditions of emulsification. The invention is thus applicable to the formation of aqueous emulsions of cellulose acetate and mixed esters and a water repellent material such as paraffin waxes, natural and synthetic waxes and wax-like materials, heavy metal salts of higher fatty acids such as aluminium and zinc stearates, higher fatty acids such as oleic or stearic acid, natural and synthetic resins, such as kauri gum, dewaxed damar, vinylite resins, the oxidizing type of alkyd resins modified with drying type fatty acids or oils (rezyls), santolites (aryl-sulfonamides-formaldehyde resins). These objects are accomplished by the following invention wherein a solution of cellulose acetate of different acetic acid content of 52% to 55%, of cellulose acetate-butyrate, cellulose acetate-propionate in isophorone and its homologues is mixed by stirring or in a colloid mill or in a homogenizer with a concentrated aqueous solution of a protective colloid preferably of gelatine (glue) or better with an aqueous solution of a mixture of the maleic acid salt of glutin-peptone and sulphonated castor oil. It is convenient to prepare the emulsions by mixing the lacquer phase and the water phase at a temperature of about 50 to 75 C. in a concentrated form for economy on transport where they are diluted with cold or warm water on the place of use.

The preferred member of the isophorone series is isophorone, but higher isophorones such as obtained by condensation of methyl-propyl (isopropyl, n. amyl, n. nonyl, n. hexadecyl) ketone are also useful.

Besides the effect of the protective colloid and the emulsifier the preparation of aqueous emulsions of cellulose esters of lower aliphatic acid according to my invention is mostly influenced by the unsaturated dicarboxylic acid, maleic anhydride, which forms with the isophorones a labile addition product 7.5.5 trimethyl cyclo (hexanone 3-butan) 1.2 dicarboxylic acid. The salt-like compound, formed by interaction with the liquefied, hydrolyzed protein (glue) decreases the interfacial tension and favors the stabilization of the emulsion.

The process according to the present invention consists in impregnating fibers, especially from viscose, casein, soya bean protein, or textile fabrics such as from cotton, felts, silk, woolen and worsted, rayon with aqueous emulsions of cellulose acetate or mixed esters, respectively with such emulsions modified with water repellent materials.

Suitable aqueous emulsions of cellulose acetate, cellulose acetate-butyrate, cellulose acetate-propionate, prepared in two parts, the lacquer phase and the water-phase may be prepared as follows.

Lacquer phase (I). Water phase (II). Parts by weight.

Example 1

(I)

Isophorone _____ 100
Cellulose acetate or mixed ester_____ 18
Dissolved at 95 C.

(II)

Water _____ 100
Gelatine _____ 15-20
Solution is made by heating one hour at 90 C.

Example 2

(I)

Isophorone _____ 100
Cellulose acetate or mixed ester_____ 18
Dissolved at 95 C.

(II)

Water _____ 100
Gelatine _____ 20
Solution is made by heating one hour at 95 C.
Maleic anhydride_____ 2
Sulfonated castor oil_____ 2-3

Mixing one part of the lacquer phase with one part of the water phase at a temperature of 50 to 75 C., there is obtained a concentrated aqueous emulsion of cellulose acetate, resp. of cellulose acetate-butyrate, cellulose acetate-propionate.

Example 3

A diluted emulsion of cellulose acetate or mixed esters is prepared by diluting one part of the concentrated emulsion, obtained by Examples 1-2, with water. The content of cellulose ester is different as the ratio.

|  | Per cent |
|---|---|
| One part of concentrated emulsion : 2 parts water | 3 |
| One part of concentrated emulsion : 3.5 parts water | 2 |
| One part of concentrated emulsion : 9 parts water | 0.9 |

Example 4

|  | a | b | c |
|---|---|---|---|
| Isophorone | 30 | 10 | 10 |
| Paraffin wax | 10 |  |  |
| Aluminium stearate |  | 3 |  |
| Stearic acid |  |  | 1.4 |
| Oleic acid |  |  | 0.6 |

The solutions of the different water repellent materials are prepared at 80 C. and mixed with the concentrated aqueous emulsions of the cellulose esters prepared by Examples 1-2. After diluting with water, ratio 1:9 the aqueous emulsions contain paraffin wax 0.5%, aluminium stearate 0.15%, higher fatty acids (0.1%).

To obtain a water repellent finish on fibers or textile fabrics, without disadvantageously altering the feel of the goods, one of the emulsions, described in Examples 1-4 may be applied. According as to the kind of material to be treated the pH value of the diluted emulsion may be adjusted by the addition of soap solution, alkaline salts to 4.5-7.5. After the goods have been steeped or padded through the emulsion, excess of the impregnation solution may be removed so that the amount of it remaining in the material is equal to 60 to 100% of the weight of the material. The emulsions are applied by known methods of impregnation, such as spraying, brushing, dipping, by the use of a tank, mangle, jig, hank-dyeing machine or the like. Since the diluted emulsions are stable at elevated temperatures, it is advantageous to use the impregnating bath at 50 to 90 C., altho it can be used at lower temperatures.

While water-repellent materials as exemplified by paraffin wax, aluminiumstearate, higher fatty acids are not absolutely necessary, they are highly desirable inasmuch improved fixing action of the cellulose acetate follow the addition of these water-repellent materials especially when the goods afterwards are treated with soap solutions, before or after drying.

Should a resistance to water pressure be required, the emulsions can be used in the concentrated state, as exemplified in Example 1, so that the product will be classed as a coated fabric. Besides it may be convenient to prepare the emulsions without dilution with water with an appearance of a latex for economy in transport where they are diluted remote from the place of use.

The fabrics have a water repellent finish and are markedly superior in laundry resistance of the finish, to fibers and fabrics treated with emulsions containing casein, gelatine without cellulose acetate.

In order that the invention may be clearly understood and readily carried into effect, certain examples of modes of carrying the new process into effect will now be described in greater detail.

Example 4

Fibers such as rayon, viscose staple fiber, casein and soya bean protein fibers are impregnated with a diluted aqueous emulsion of cellulose acetate, as specified in Example 2, 3 (b) (c). The saturated fibers are hydroextracted so as to retain about 80% of their weight of liquor. The impregnated fibers are partially or completely dried and are then submitted to the action of moist heat at 60 to 70 C. for 1-2 hours, whereafter the goods are finished as usual.

Example 5

Felt hat shapes are wetted out in a 5% solution of sodium acetate, hydroextracted and then immersed in a bath containing the diluted emulsion as specified in Example 3 (a) (b). The goods after thorough impregnation are again hydroextracted so as to leave 80 to 100 per cent of their weight of liquor within them. They are now dried at 100 C. and submitted to steam at this temperature for 15 minutes, when they may be at once submitted to the customary finishing processes.

Example 6

Viscose yarn stockings after rinsing were placed in a bath containing a diluted emulsion of cellulose acetate as specified in Example 3 (a) (b). After thorough impregnation the stockings were boarded and dried at an elevated temperature.

Example 7

Into a diluted emulsion as specified in Example 3 (a) (c) a cotton poplin is padded so as to emerge containing from 80-100 per cent of its weight of the liquid and is then directly passed to a high temperature continuous steamer.

Example 8

Rayon piece goods were impregnated at 70-85 C. by means of a padder with an emulsion as specified in Example 3, then dried and calendered.

The water used for diluting the concentrated aqueous emulsion of cellulose acetate or mixed esters and glutin-peptone may contain 0.75 part per thousand phenylmercuriacetate but this is not absolutely necessary because of the antiputrescent action of isophorone, the ketone or alcohol derivatives of alkylsubstituted cyclohexen.

The examples of emulsions useful in the impregnation of textiles and in the coating field have indicated a wide range of conditions as to the amount of cellulose acetate, the amount of gelatine, the amount of water-repellent material. These can be varied considerably from the preferred amounts given in the examples and yet within the scope of the invention. The aqueous emulsion of cellulose acetate and mixed esters is of the oil in water type, is of white or creamy colour and contains mixed emulsifying agents. The formation of adsorbed interfacial cellulose acetate films at the isophorone/water interfaces shows that there is a marked and apparently specific effect brought about by maleic anhydride respectively by maleic acid. This is attributed to the balanced emulsifying agent by anchoring of an unsaturated acid to the cyclohexen-derivative as 1:1 adduct dissolving on the one side of the interface the cellulose ester and forming on the other side a salt like compound with gelatine-peptone which envelopes the dispersed globules by a gelatinous film and offers resistance to the coalescence of the cellulose ester globules. Using gelatine-peptone, the emulsions are especially stable in the region pH 2 to 8, because the positively charged gelatine derivative ion is much more readily adsorbed. The gelatine concentration required is a function of the pH value, increasing with increasing value. The electrical charge on the cellulose esters is the real factor determining the stability of the emulsion. The salt-like compound of maleic acid and gelatine-peptone considerably alters the emulsifying capacity, rising the iso-electric point from 4.7 to 8, where the interfacial tension and viscosity are at a minimum and the relative viscosity is decreased where a higher concentration of gelatine-peptone enhances the emulsifying power.

The emulsions are compatible with soap solutions, salts with ions of higher hydration such as $Na_2SO_4$, $NaCl$ are most effective in the salting out of the emulsoids. Therefore where it is desired to eliminate the glue, the impregnated fabrics may be rinsed in salt solutions, then with hot water and finally dried.

The above description and examples are intended to be illustrative only. Any modification of or variation therefrom which conforms to the spirit of the invention is intended to be included within the scope of the claims.

I claim:

1. A stable diluted aqueous emulsion of cellulose acetate consisting of a solution of cellulose acetate in isophorone, an aqueous solution of gelatine and maleic anhydride and sulfonated castor oil.

2. A stable diluted aqueous emulsion of cellulose-acetate-butyrate consisting of a solution of cellulose-acetate-butyrate in isophorone, an aqueous solution of gelatine and maleic anhydride and sulfonated castor oil.

3. A stable diluted aqueous emulsion of cellulose-acetate propionate consisting of a solution of cellulose-acetate propionate in isophorone, an aqueous solution of gelatine and maleic anhydride and sulfonated castor oil.

4. A stable diluted emulsion consisting of a cellulose ester of the class consisting of cellulose acetate and mixed esters of cellulose acetate emulsified in a mixture of a condensation product of a member of the isophorone series and a member of the series of unsaturated dibasic acids and an aqueous solution of an organic hydrophilic colloid containing sulfonated castor oil.

5. A stable diluted emulsion consisting of a cellulose ester of the class consisting of cellulose acetate and mixed esters of cellulose acetate which comprises dissolving a member of the group consisting of cellulose acetate and mixed esters of cellulose acetate in a solvent consisting of a member of the isophorone series, emulsifying the so obtained solution with an aqueous solution of an organic hydrophilic colloid containing a member of the series of unsaturated dibasic acids and an emulsifying agent, diluting the so obtained emulsion with water.

6. Method of preparing stable, diluted aqueous emulsions of cellulose esters of the class consisting of cellulose acetate and mixed esters of cellulose acetate, which comprises dissolving cellulose acetate in isophorone, emulsifying the so obtained solution with an aqueous solution of gelatine, containing maleic anhydride and sulfonated castor oil, diluting the so obtained emulsion with water.

7. Method of preparing stable, diluted aqueous emulsions of cellulose acetate-butyrate, which comprises dissolving cellulose acetate-butyrate in isophorone, emulsifying the so obtained solution with an aqueous solution of gelatine, containing maleic anhydride and sulfontaed castor oil, diluting the so obtained emulsion with water.

8. Method of preparing stable, diluted aqueous emulsions of cellulose acetate-propionate, which comprises dissolving cellulose acetate-propionate in isophorone, emulsifying the so obtained solution with an aqueous solution of gelatine, containing maleic anhydride and sulfonated castor oil, diluting the so obtained emulsion with water.

OSKAR HUPPERT.